Nov. 17, 1959    H. W. TWYMAN    2,912,755
POTATO PEELER OR THE LIKE
Filed Jan. 18, 1957
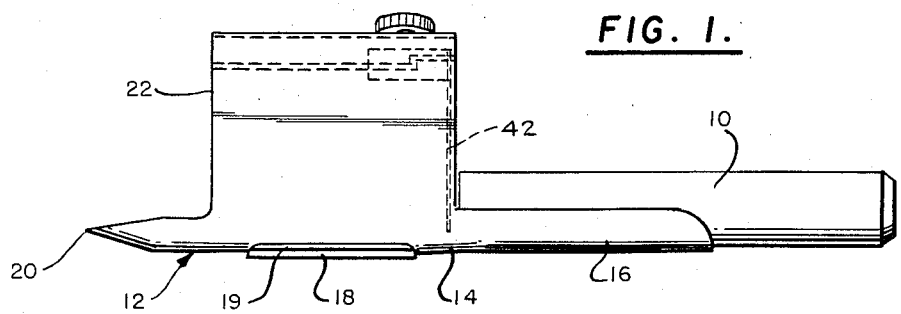
FIG. 1.
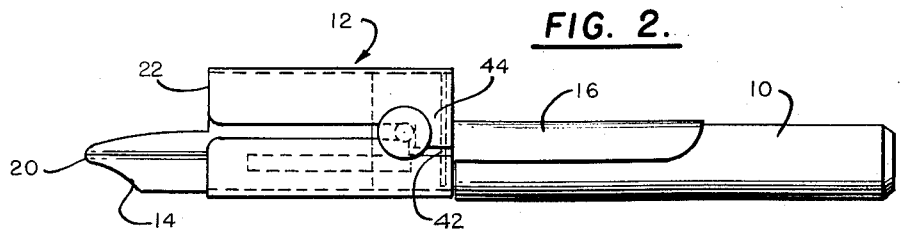
FIG. 2.
FIG. 3.
FIG. 4.
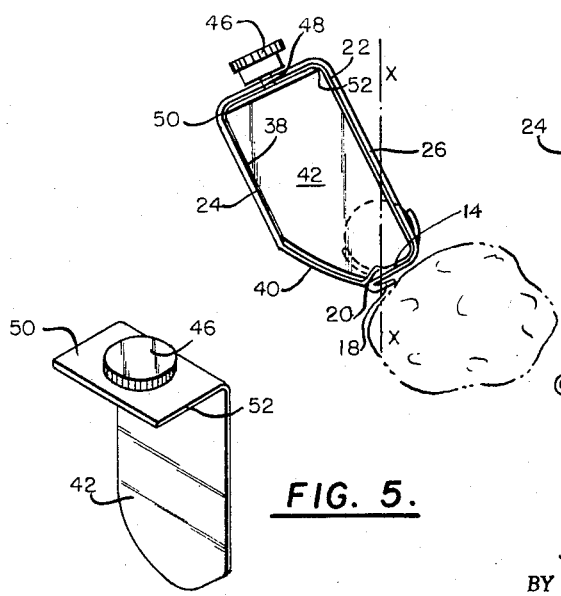
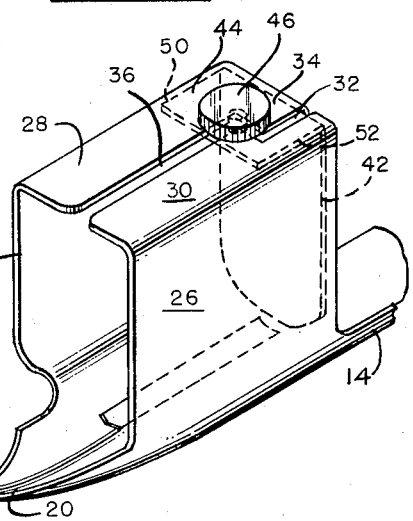
FIG. 5.
INVENTOR
Harold W. Twyman
BY *Munn, Liddy, Daniels & March*
ATTORNEYS – # United States Patent Office 2,912,755
Patented Nov. 17, 1959

2,912,755

POTATO PEELER OR THE LIKE

Harold W. Twyman, Thursley, England

Application January 18, 1957, Serial No. 634,983

4 Claims. (Cl. 30—128)

This invention relates to potato peelers or the like, and particularly to a utensil useful in peeling the skins and removing the eyes from potatoes or similar vegetables.

One of the objects of my invention is to provide a potato peeler embodying a receptacle for receiving and retaining the peelings as the peeling operation is performed.

Among the problems involved in providing a means for retaining peelings during the peeling of a potato is the likelihood of added structure unduly increasing weight, bulkiness and awkwardness of the device. A heavy device would be difficult for the average person to use and would also contribute to fatigue and be unsatisfactory from this aspect. A bulky or obstructive device will also be difficult to use, due to obstruction of vision, for example, and actually slow down the operation. Accordingly, a further object of my invention is to provide a potato peeler embodying a receptacle for receiving peelings which is light in weight, non-obstructive visually, of simple structure, and can be easily held and used.

A still further object of my invention is to provide a potato peeler embodying a receptacle for receiving peelings which will not interfere with the normal procedure of peeling the potatoes.

If a peeler constructed according to the above objects is provided with a receptacle in which the peelings will stick and cannot be readily removed, it will then be unsatisfactory. Accordingly one of the objects of my invention is to provide a peeling device embodying a receptacle for receiving the peelings and including means facilitating ready ejection of the peelings from the receptacle.

Yet a still further object of my invention is to provide a peeler embodying a receptacle for receiving peelings and an ejector means in which the ejector is smooth operating and including stop means for limiting the movement of the ejector.

Further, an object of my invention is to provide a peeler including a receptacle for receiving peelings and an ejector in which the said ejector serves also to form a portion of the receptacle, such receptacle being set tangentially to the circumference of the handle at an angle calculated to obviate visual obstruction during operation of the device.

These and other objects and advantages will become apparent from the following description and the accompanying drawings, in which:

Figure 1 is a side elevational view showing a peeler constructed in accordance with the invention.

Figure 2 is a top plan view.

Figure 3 is a front end elevational view.

Figure 4 is a fragmentary perspective view, and,

Figure 5 is a perspective view of the ejector forming part of the invention.

Similar reference characters in the several figures indicate similar parts.

Referring now particularly to the drawings wherein is shown a preferred form of the invention, the peeler is seen to comprise a handle 10, and a combined peeler, eyer and peel receptacle indicated generally by reference character 12. The handle may be formed of wood, plastic or any other suitable material and the metal parts preferably of stainless steel. The combined peeler, eyer and peel receptacle 12 is formed either of a separate element conveniently attached to the handle or integral with it if the handle is of metal. The peeler and eyer includes a trough-shaped knife blade member or portion 14. The latter includes a section 16 formed complementary to handle 10. Blade member 14 is also provided with a peeling or cutting edge 18. The latter is formed by being stamped out of blade member 14 in the usual manner. This leaves a slot 19 between cutting edge 18 and blade member 14 to receive peelings. The eyer 20 is formed by pointing the end of the member 14 as indicated.

Reference character 22 designates a peel receptacle. The peel receptacle 22 is positioned to receive peelings from peeling edge 18. In the preferred form illustrated in the drawings receptacle 22 is formed integrally with blade member 14, the whole of the member 12 and 16 being formed as a stamping and bent to the shape illustrated. The peel receptacle includes spaced complementary formed side panels 24 and 26. The latter extend upwardly and outwardly from the blade member 14. The side panels 24 and 26 terminate in upper flanges 28 and 30, respectively. Flange 30 has a recess 32 and flange 28 is provided with an extension 34 projecting into recess 32. The inner edges of the flanges 28, 30, are, however, spaced from each other to form a slot 36 extending rearwardly to extension 34. The distance between flange extension 34 and recess 32 is less than the width of the slot 36.

Referring particularly to Figure 3: It is to be noticed that the side panel 26 extends upwardly on one side of the longitudinal axis of the handle, whereas the side panel 24 extends upwardly on the other side. Side panel 26 is closer to the axis of handle 10 than is side panel 24. Further, side panel 24 is formed by two portions, namely 38 and 40. The latter has a slight curve. Panel portion 40 merges with the blade member 14 at a point approximately the same distance laterally to one side of the longitudinal center line of the handle 10 as the panel 26 is spaced therefrom on the opposite side, but extends, generally speaking, at an acute angle with respect to panel 26 throughout its curvilinear length.

Panel portion 38, however, extends parallel to panel 26. Thus panel 24 is, throughout most of its length, offset to one side of the axis of handle 10 a greater distance than panel 26 is offset to the opposite side. This results in the lateral offsetting of receptacle 22 from plane x—x containing the peeling or cutting edge 18 and the axis of handle 10, and also in receptacle 22 being laterally offset to one side of the longitudinal axis of handle 10. Preferably as illustrated in the drawings, this offset is to the side opposite the cutting edge 18 of the blade member 14. Considered in another light and particularly regarding the position of the edge 18, receptacle 22 is laterally offset with respect to the handle to one side thereof, with the cutting edge of the blade member facing the opposite side of the handle. The purpose of this offset of receptacle 22 is to provide an unobstructed view of the peeling process during operation of the device.

Figure 3 illustrates the position which receptacle 22 assumes during the peeling of a potato, for example. It will be understood that the respective relationship of the elements (handle, peeling edge, receptacle) can be reversed from that shown in Figure 3 if a manufacturer should so desire.

An ejector plate 42 is mounted within the confines of the side panels 24 and 26 and formed complementary therewith. The latter plate is seen to be attached to or formed integrally with an upper flange 44 which extends beneath slot 36. A knob 46 is connected to flange 44 by a pin 48. Pin 48 projects through slot 36. With the elements assembled as indicated in Figures 1 through 4, plate 42 substantially closes the chamber 22 adjacent the handle 10. The plate can be slid forwardly, as viewed in Figure 4, and removed from the receptacle.

The use of the device is apparent and it is obvious that as the potatoes or similar vegetables are being peeled the peelings will accumulate within the chamber 22. When the chamber has been filled with peelings knob 46 can be used to slide plate 42 forwardly to eject the peelings. The parallel side portions 50 and 52 of the flange 44 maintain the plate 42 in proper relationship with the side panels 24 and 26.

While I have shown and described a preferred form of my invention, it will be understood that variations in details of form may be made without departure from the invention as defined in the appended claims.

I claim:

1. A peeler comprising an elongated knife blade member having a cutting edge therein, outwardly of one side of the blade member and spaced therefrom to form a peel receiving slot, a handle attached to one end of the member, a peel receptacle attached to the blade member and extending outwardly from the other side of the member, the receptacle having opposed, upstanding spaced parallel sides and a connecting top surface, defining an open end away from the handle, an ejector of stiff material mounted within the receptacle transversely thereof and movable longitudinally of the receptacle and means to support the ejector from the top surface and guide it longitudinally, as it is moved.

2. The device of claim 1, in which the means comprises a flange joined to the top surface end of the ejector transversely thereof, so as to slidably engage the top surface of the receptacle.

3. The device of claim 1, in which the means comprises a longitudinal slot in the top and a knob having a pin extending through the slot and connected to the ejector.

4. The device of claim 1, in which one of the parallel sides of the receptacle defines substantially a plane located closer to the cutting edge of the blade member than the other parallel side.

References Cited in the file of this patent

UNITED STATES PATENTS

| | | |
|---|---|---|
| 935,404 | Ray | Sept. 28, 1909 |
| 2,213,015 | Parent | Aug. 27, 1940 |